United States Patent [19]

Fefeu et al.

[11] Patent Number: 5,027,996
[45] Date of Patent: Jul. 2, 1991

[54] METHOD OF MANUFACTURING A HOLLOW SHAFT WITH INTERNAL SWELLINGS OF REVOLUTION AND SHAFT OBTAINED BY THIS METHOD

[75] Inventors: Michel A. Fefeu, Magny les Hameaux; Gérard Perrin, Chatenois les Forges, both of France

[73] Assignee: Floquet Monopole, Poissy, France

[21] Appl. No.: 471,741

[22] Filed: Jan. 29, 1990

[30] Foreign Application Priority Data

Jan. 27, 1989 [FR] France ................. 89 01036

[51] Int. Cl.[5] ................. B23K 20/12; B23K 101/04
[52] U.S. Cl. ................. 228/112; 228/114
[58] Field of Search ................. 29/888.044, 888.05, 29/888.057; 228/112, 114

[56] References Cited

U.S. PATENT DOCUMENTS 4,677,722  7/1987  Emmer ................. 29/156.5 A
4,712,941  12/1987  Emmer ................. 403/161

Primary Examiner—Sam Heinrich
Attorney, Agent, or Firm—Larson and Taylor

[57] ABSTRACT

A method of manufacturing a hollow shaft having internal swellings of revolution is disclosed. Hollow shaft sections, each having at least one internal swelling of revolution, are consecutively formed in a substantially continuous cold extrusion process using a single punch 7. Tubular blank 1a is extruded through narrowed orifice 14 of die 8. Tip 10 of punch 7 is inserted into axial passage 11 of blank 1a and shoulder 13 of punch 7 engages a rear end of blank 1a to push blank 1a partially through narrowed orifice 14 and thereby compress the front end of blank 1a between tip 10 and narrowed orifice 14. Punch 7 is then removed from die 8 and another tubular blank 12 is introduced in die 8 with its front end in abutment with the rear end of deformed blank 1b. With tip 10 to punch 7 partially removed from passage 11 of deformed blank 1b, shoulder 13 of punch 7 engages the rear end of blank 12 and pushes blank 12 through die 8 thus causing the formation of an internal swelling (2, 2') in the portion of blank 1b situated in front of tip 10. Force is continued on blank 12 until blank 1c is completely removed from die 8 leaving blank 12 in the position that original blank 1a was in at the beginning of the operation.

4 Claims, 3 Drawing Sheets

METHOD OF MANUFACTURING A HOLLOW SHAFT WITH INTERNAL SWELLINGS OF REVOLUTION AND SHAFT OBTAINED BY THIS METHOD

The present invention relates first of all to a method of manufacturing a hollow shaft with internal swellings of revolution, which consists in forming first of all hollow shaft sections each comprising at least one internal swelling of revolution, then in assembling two sections coaxially end to end so as to obtain a hollow shaft comprising internally at least two swellings of revolution.

Such a method is known from the document U.S. Pat. No. US-A-4,677,722. Such hollow shafts with internal swellings are useful particularly for providing connection between a connecting rod small end and an internal combustion engine piston, these shafts being subjected to high flexion and ovalization forces which, because they are fitted between the two bearings of the piston, are not uniformly distributed. The internal swellings, which are of course located at the positions of the shaft which are subjected to the highest flexion and ovalization forces, namely at the level of the planes which, after fitting of the shaft, will be situated between each bearing of the piston and the connecting rod, avoid having to give to such shafts a relatively large wall thickness, overdimensioned in the zones of the shaft subjected to the lowest forces, namely essentially the ends of the shaft which are engaged in the. bearings of the piston, and the central zone of the shaft which is engaged in the bore of the connecting rod small end.

In the above mentioned document, the method of manufacturing the shaft sections requires the use of two punching dies acting against a blank in two opposite directions, with each time the necessity of taking the thus hollowed blank from the die, which represents a long and difficult operation. Then, it is advisable to perforate the central web with a tool such as a milling cutter, which is an additional operation and which means that this is an essentially discontinuous method with reduced productivity.

It should be further noted that the method according to the above American patent does not in fact allow the part such as is shown in FIG. 7 of the patent to be obtained. In fact, it is clear from FIG. 5 that the thickest parts have a flat profile due to machining by the tool and not the rounded profile shown in FIG. 7.

The object of the present invention is to overcome these drawbacks of the prior art and, for this, provides a method of manufacturing a hollow shaft with internal swellings of revolution in accordance with the invention of the general type defined at the beginning, which is essentially characterized in that said sections are formed by cold extrusion operations using a single punch, without removal of the part and without subsequent machining, these extrusion operations comprising:

extrusion over a part of its length of a tubular blank through the narrowed orifice of a die, the tip of a shouldered punch engaging in an axial passage of said blank whereas the latter is pushed by said shoulder, pushing the blank thus deformed by means of an insert piece between said shoulder and said first blank, the tip of the punch being thus partially removed from the passage of said first blank; which produces an internal swelling in the portion of the blank situated in front of said tip of the punch, whereas this blank is completely removed from the die.

Such a method is practically continuous, as will be better seen hereafter, requiring in particular no removal of the blank once it has been engaged in the die, whether for machining it or for any other reason.

A method in accordance with the invention may be further characterized in that said insert piece is formed by the next blank, which contributes to making the method substantially continuous and allows high productivity to be obtained; it should be noted that the blank enters through one end of the die and is pushed therethrough always in the same direction and leaves through its other end, which avoids any waste of time.

The invention also relates to a hollow shaft intended in particular to provide the connection between the connecting rod small end and an internal combustion engine piston, this shaft being profiled inwardly so as to have at least two swellings of revolution, at the level of the zone or zones likely to be subjected to the highest forces, namely at the level of its respective shearing planes, this shaft being characterized in that it is manufactured according to the method which has just been defined.

This shaft may in particular be characterized by the fact that the internal swelling of revolution of each section has a practically sinusoidal profile, this being obtained directly at the outlet of the cold extrusion die, without any subsequent machining.

Embodiments of the invention will now be described with reference to the figures of the accompanying drawings in which.

Figure 1:
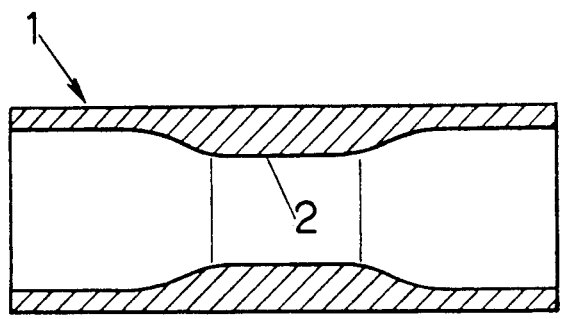
FIG. 1 is an axial sectional view of a sinusoidal shaft section in accordance with the invention, with central internal swelling.

The shaft section 1 of FIG. 1, for example made from blister steel, comprises inwardly a swelling of revolution 2. It can be seen that it extends centrally over practically a third of the length of the section. Of course, its extent in length could be less.

When it is desired to obtain hollow shafts with two internal swellings, separated by a central zone of reduced thickness (thickness substantially equal to that of the ends), as is the case in particular for connecting rod-piston connecting shafts, two sections 1 may first of all be manufactured similar to that of FIG. 1, and welded end to end. This is what has been shown in FIG. 2, in which the sections have been referenced 1 and 1' and their respective internal swellings 2 and 2'. The external 3, 3' and internal 4, 4' beads are due to the method of welding by inertia (or by friction): the two sections are aligned, one is driven in rotation and the other, which is fixed, is pressed thereagainst for contacting the two surfaces; the friction heating which results causes welding thereof, at which moment of course positive driving thereof is stopped.

Figure 2:
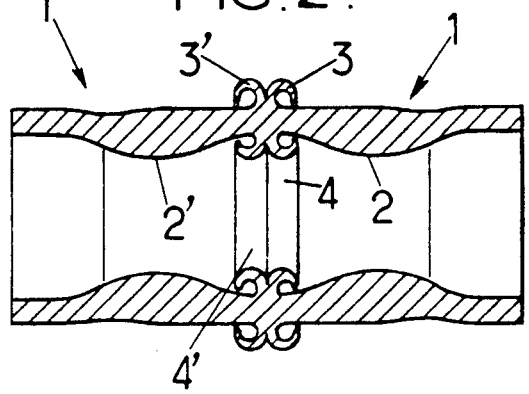
FIG. 2 is an axial sectional view of two shaft sections similar to those of FIG. 1 (but shorter) butt-jointed by a friction welding operation, these two sections thus forming a shaft blank.
Figure 3:
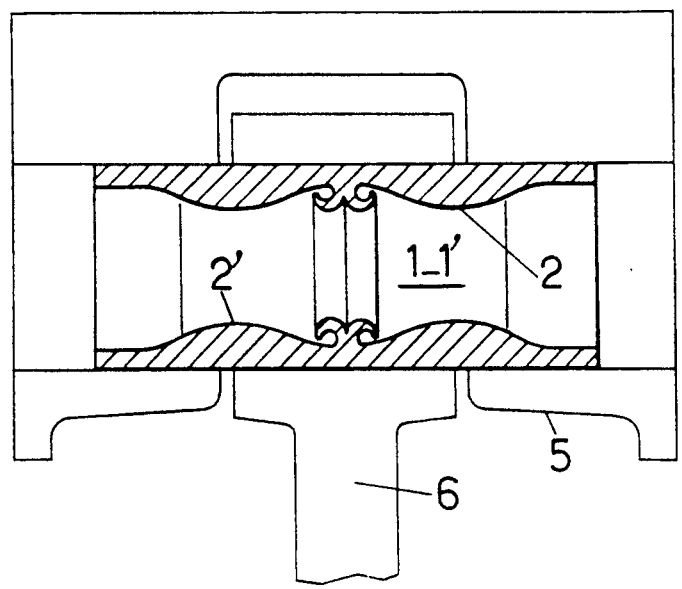
FIG. 3 is an axial sectional view of the finished shaft obtained by external machining of the blank of FIG. 2.

FIG. 3 shows the finished shaft, obtained by externally machining the blank of FIG. 2. In this figure, the bearings 5 of the internal combustion engine have been shown with phantom lines, which this shaft 1—1' is supposed to connect to the connecting rod small end 6.

It will be understood that such a shaft has ends and a central portion which are thinner with respect to known shafts having equivalent external dimensions and subjected to the same forces, and that the normal thickness is only to be found at the level of the swellings 2 and 2'; the saving in weight is therefore appreciable.

The following figures show the method of manufacturing sections such as 1 and 1' by cold extrusion.

In FIGS. 4 to 7, the punch (or extrusion needle) has been referenced 7 and the die 8.

Figure 4:
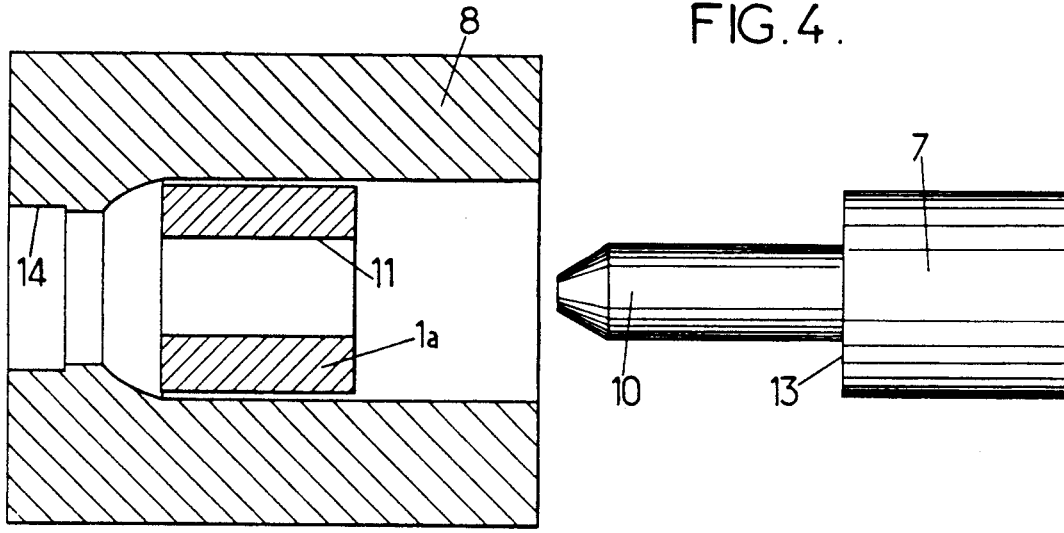
FIGS. 4 to 7 are schematic axial sectional views of the die and of the cold extrusion punch for the shaft sections, showing the different extrusion steps.
Figure 5:
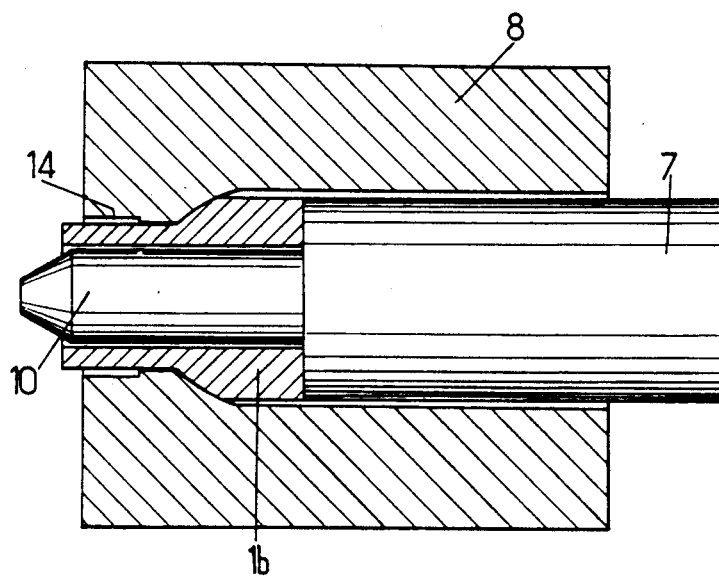
Figure 6:
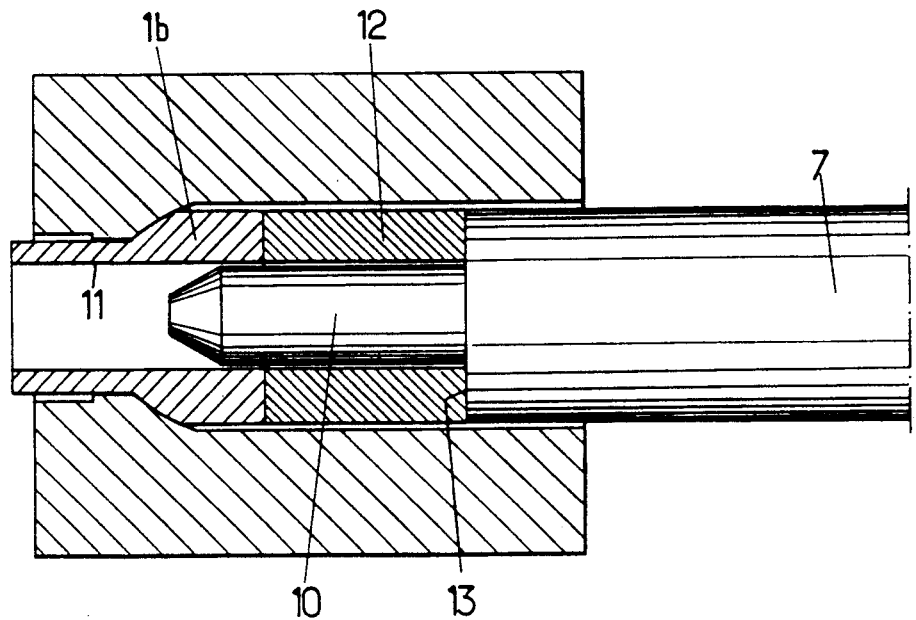
Figure 7:
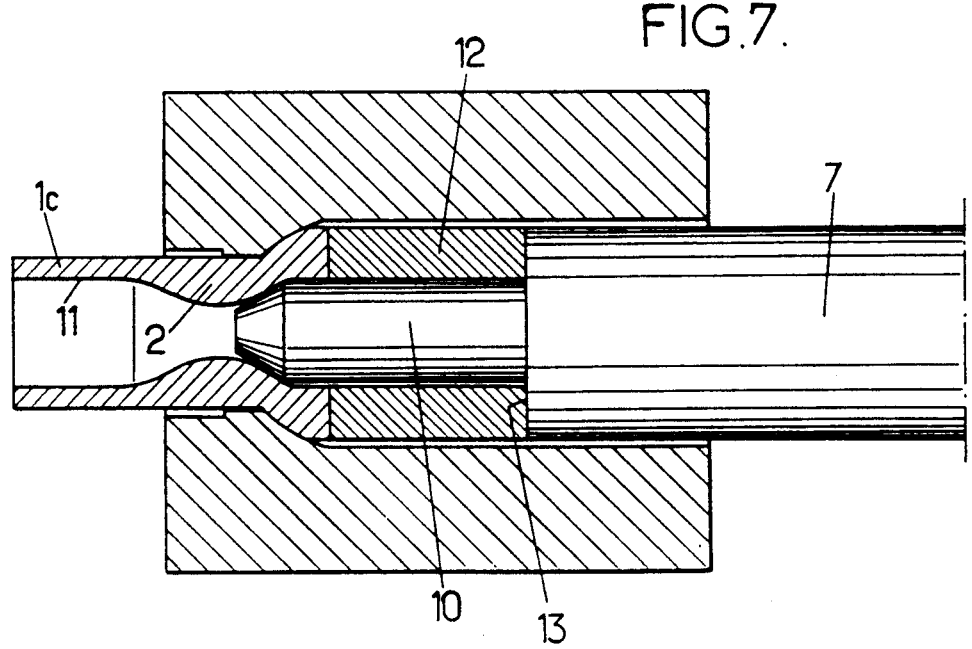

FIG. 4 shows a tubular blank 1a placed in the die and FIG. 5 its deformation 1b, after engagement of the tip 10 of the punch in its axial passage 11. It can be seen that the rear end of the blank is pressed by shoulder 13 of the punch and that its front end is extruded, being compressed between tip 10 of the punch and the narrowed orifice 14 of the die.

The punch 7 is then removed and a new blank 12 is introduced in die 8, behind blank 1b.

With pressure again applied to punch 7, and with its tip 10 thus partially withdrawn from passage 11 of the first blank, it can be seen that the thrust of the following blank 12 will cause the formation of swelling 2 just in front of tip 10. The section shown in FIG. 1 is thus obtained, after continuing the thrust to push it completely out of the die. The new blank 12 is then in the position in which blank 1a is shown in FIG. 4, and the cycle is repeated in the same way.

It should be noted that instead of the following blank 12, an indeformable insert tooling piece could be used but that the advantage of using the following blank for pushing the preceding blank is obviously to arrive at an appreciable saving in time.

It is also clear from FIGS. 2 and 3 that the profile of swellings 2, 2' is practically sinusoidal and this in a natural way, because of the cold extrusion operation alone, without any subsequent machining. This forms an additional interesting result of the invention, for this substantially sinusoidal form of the swellings is in practice ideal from the point of view of the mechanical strength of the shaft, as demonstrated by theory.

We claim:

1. A method of manufacturing a hollow shaft with internal swellings of revolution, which comprises forming first and second hollow shaft sections each having at least one internal swelling of revolution, assembling said first and second sections coaxially end to end so as to obtain a hollow shaft having at least two internal swellings of revolution, said first and second sections being formed by cold extruding operations using a single punch without removal of said sections and without subsequent internal machining, said extruding operations comprising:

extruding, over a part of its length, a tubular blank through a narrowed orifice of a die with a tip of a shouldered punch engaging an axial passage of said blank while said blank is simultaneously pushed by said shoulder to thereby deform said blank, pushing thus deformed on said blank by means of an insert piece interposed between said shoulder and said blank with the tip of the punch being thus partially removed from the passage of said blank;

said pushing thus producing an internal swelling in a portion of said blank situated in front of said tip of the punch.

2. The method according to claim 1, wherein said insert piece is formed by a further tubular blank.

3. The method according to claim 1, wherein said first and second sections are mutually fixed together by welding.

4. The method according to claim 3, wherein said welding comprises axially aligning said first and second sections, and axially rotating said second section with respect to said first section while pressing said two sections together until friction heating results in welding thereof.

* * * * *